Dec. 18, 1928.

F. CONRAD 1,695,917

ELECTRICAL MEASURING INSTRUMENT

Filed Dec. 31, 1921

WITNESSES:

INVENTOR
Frank Conrad
BY
ATTORNEY

Dec. 18, 1928.

F. CONRAD 1,695,917

ELECTRICAL MEASURING INSTRUMENT

Filed Dec. 31, 1921     2 Sheets-Sheet 2

WITNESSES:

INVENTOR
Frank Conrad
BY
ATTORNEY

Patented Dec. 18, 1928.

1,695,917

UNITED STATES PATENT OFFICE.

FRANK CONRAD, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed December 31, 1921. Serial No. 526,232.

My invention relates to electrical measuring instruments and particularly to instruments for indicating the electrolyte level in storage batteries.

One object of my invention is to provide a device of the above indicated character that shall be readily adapted for combination with an ammeter or other measuring instrument to permit the use of a single supporting casing and a single means for controlling both the battery-level-indicating device and the ammeter or other instrument.

Another object of my invention is to provide a combination measuring instrument and battery-level indicator that shall be simple and durable in construction, economical to manufacture and effective in operation.

A further object of my invention is to provide a novel combination measuring instrument and switch mechanism for conveniently controlling the electrical circuits thereof.

In practicing my invention, I provide, in combination with a three-cell storage battery having an auxiliary electrode in each cell, a combination ammeter and battery-level-indicating device having a single permanent magnet for controlling both the ammeter and the indicator and an electromagnet for each part of the combination. The electromagnet of the indicating device is so constructed and so connected to the auxiliary electrodes as to oppose the permanent magnet so long as the battery cells maintain a predetermined electrolyte level and permits the influence of the permanent magnet to cause an indication when the liquid in any of the cells falls below the predetermined level.

A novel switch mechanism is provided and so mounted directly on the instrument, and is so operable at a convenient position on a dashboard or similar device, as to permit and facilitate the connection and disconnection of the instrument.

Figure 1 of the accompanying drawings is a front elevational view of an instrument constructed in accordance with my invention.

Figure 1:
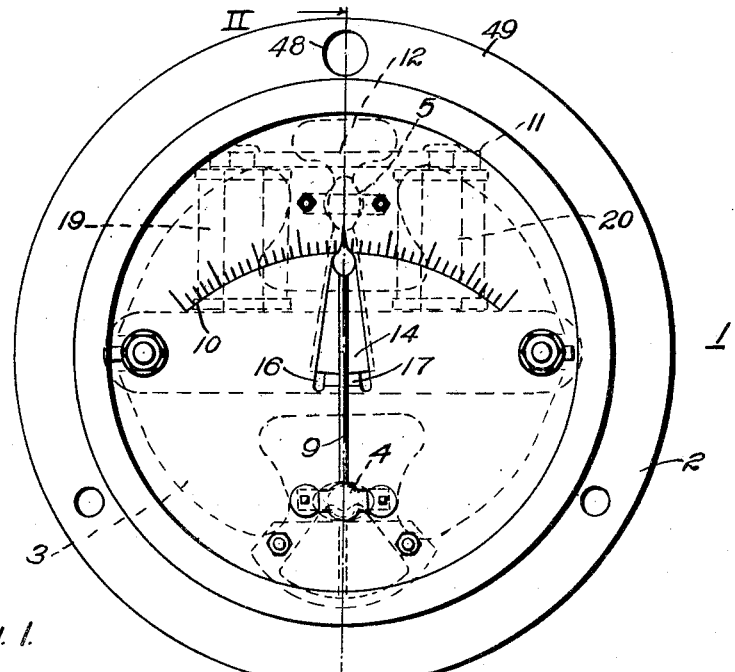
Figure 2:
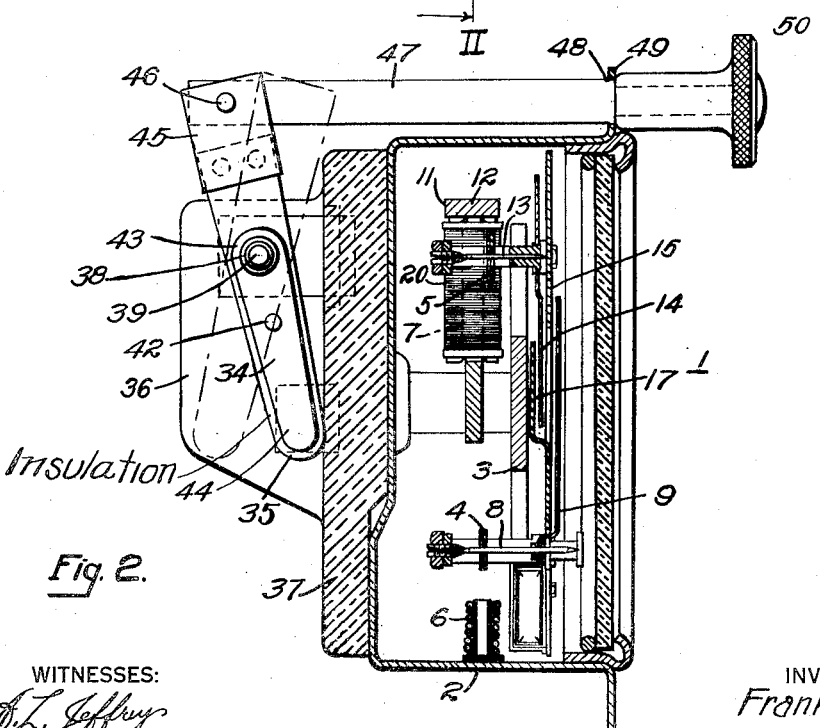
Fig. 2 is a sectional view of the device shown in Fig. 1 taken along the line II—II thereof, showing a switch structure that is omitted in Fig. 1.
Figure 3:
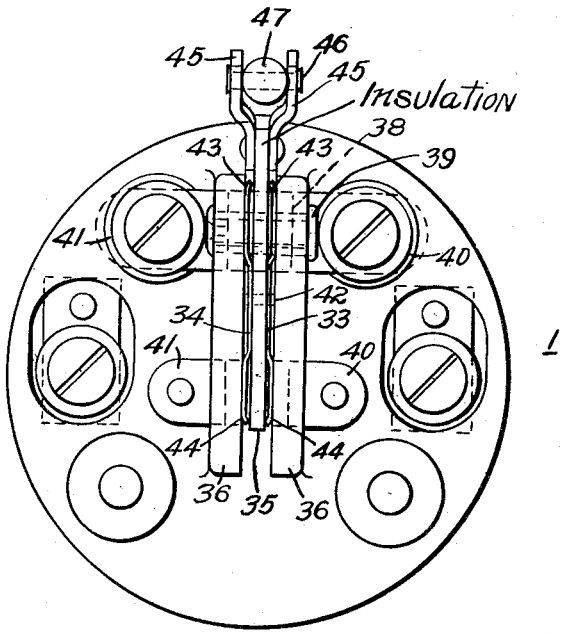
Fig. 3 is a rear elevational view of the device shown in Figs. 1 and 2.
Figure 4:
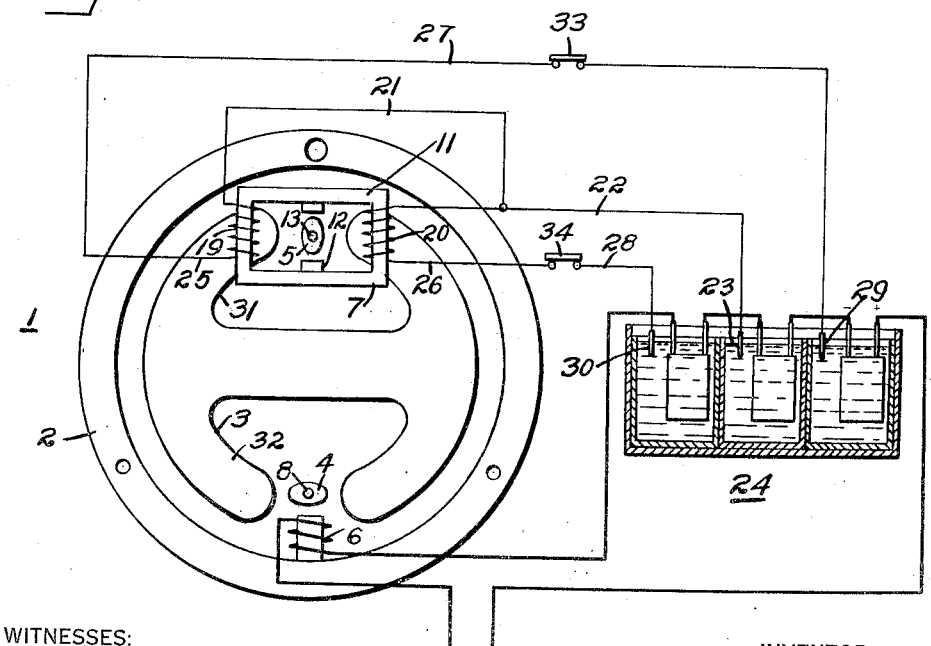
Fig. 4 is a diagrammatic view of the instrument and of the system in connection with which my invention is employed.

An instrument 1 comprises a supporting casing 2 in which a permanent magnet 3, movable magnetizable members 4 and 5 and electromagnets 6 and 7 are disposed.

The magnetizable member 4 is mounted on a shaft 8 on which a pointer 9 is mounted for cooperation with a scale 10. The member 4 is biased to zero position by the permanent magnet 3 and is actuated against the influence of the magnet 3 by the electromagnet 6 which may be connected to be energized in proportion to amperes or volts of a circuit to be measured.

The electromagnet 7 comprises a rectangular core member 11 having intermediate pole portions 12 disposed opposite the movable magnetizable member 5. The latter is mounted on a shaft 13 that carries a semaphore 14 disposed behind a dial plate 15 having an opening 16 therein. The opening 16 is preferably obtained by cutting, and pressing inwardly, a tapered or fan-shaped portion 17, of the dial plate 15, which is disposed behind the semaphore 14 in substantially parallel-plane relation to the dial plate and to the semaphore. The front surfaces of the portion 17 and of the semaphore 14 are preferably coated or otherwise constructed to be of different colors, such as red and white, respectively.

Coils 19 and 20, disposed on opposite legs of the core member 11, have a common terminal connection 21 that is connected by a conductor 22 and an auxiliary electrode 23 to the intermediate cell of a standard three-cell storage battery 24, and outside terminals 25 and 26 that are connected to the end cells of the battery 24, by conductors 27 and 28, switch members 33 and 34 and auxiliary electrodes 29 and 30, respectively.

So long as the electrolyte levels in the cells of the battery 24 remain of sufficient height to engage the auxiliary electrodes 23, 29 and 30, a difference of potential exists between the latter to cause opposing currents to traverse the coils 19 and 20. The opposing currents, thus caused, generate opposing magnetic fluxes in the core member 11 to thereby render the pole portions 12 effective to attract the movable magnetizable member 5 to the position shown. In this position, the semaphore 14 is in the position shown in Fig. 1 and the white area thereof, showing through the opening 16, indicates that the electrolyte levels in the battery cells are sufficiently high.

Should the electrolyte level in any one of the battery cells fall sufficiently to disengage the auxiliary electrode thereof, current will flow through one or both of the coils 19 and 20 in such direction as to cause the flux in the core member 11 to flow in a closed circuit around the latter, thereby nullifying the effect of the flux in the movable magnetizable member 5.

Should the electrolyte in two or three of the cells fall below the auxiliary electrodes, the coils 19 and 20 will be de-energized and the movable magnetizable member released from the influence of the electromagnet 7.

In any of the above described instances, where the movable magnetizable member 5 is released from the position in which it is held by the electromagnet 7, the member 5 is then positively influenced by the permanent magnet 3 and so turned that the semaphore 14 is moved to expose the red area of the portion 17 behind the opening 16. Thus, an indication that the level in one or more of the battery cells has fallen to a dangerous position is given.

The permanent magnet 3 is preferably provided with two pairs of pole projections 31 and 32 for controlling the movable magnetizable members 4 and 5, respectively.

The switch members 33 and 34 are mounted on an insulating lever arm 35 that is pivotally supported between parallel barrier or supporting plate portions 36 projecting rearwardly from an insulating disk 37. The latter is secured to the rear side of the casing 2. The lever 35 is pivotally mounted on an insulating sleeve 38, extending transversely through the barriers 36, that is reinforced and held in position by a headed pin or shaft 39. Two pairs of stationary terminal members 40 and 41 connect the switch members 33 and 34 between the coils 19 and 20 and the conductors 27 and 28, respectively, and are provided with inner surfaces, flush with the inner surfaces of the barriers 36, for engagement with the ends of the switch members.

The switch members 33 and 34 are each fixed, at an intermediate portion, to the insulating lever arm 35, by an insulating pin 42 and have outwardly or laterally biased free ends 43 and 44 for engagement with the stationary contact members 40 and 41. The ends 43 are each provided with a circular opening, somewhat larger in diameter than the insulating sleeve 38, to permit their free movement with respect to the sleeve.

Arms 45, riveted or otherwise secured to the upper end of the insulating lever 35, are pivoted, by a pin 46, to a plunger rod 47 that extends through an opening 48, and is supported by a flange 49, of the casing 2. A head or handle 50, at the outer end of the plunger rod 47, permits the circuit between the coils 19 and 20 and the battery cells to be interrupted during any desired time interval, such as when the automobile carrying it is in a garage, or any other device on which it is employed, is not in service.

While I have shown and described a particular form of my invention, changes and modifications may be made therein without departing from the spirit and scope of my invention, and such modifications are intended to be covered by the appended claims.

I claim as my invention:

1. An electrical measuring instrument comprising a core member of closed-loop form having oppositely-disposed inner pole portions, a permanent magnet disposed adjacent thereto having pole ends disposed on an axis angularly related to an axis through said pole portions, a pivoted magnetizable vane positioned to be influenced by said pole portions and said pole ends, and a coil on the core member at each side of the axis through said pole portions, the vane being normally adapted to lie substantially parallel to the axis through said pole portions when said coils are energized and to move toward parallelism with the axis through said pole ends when one of said coils is deenergized.

2. An electrical measuring instrument comprising a single homogeneous permanent magnet member having a plurality of portions of substantially C-shape, the ends of each of which are of opposite polarity, said portions having a common intermediate section, and indicating means cooperating with each of said portions.

3. An electrical measuring instrument comprising a dial plate having an indicating portion pressed out of the plane of the plate and separated from the plate around a portion of the perimeter of the indicating portion, and a movable indicating element adapted to move substantially in the plane of the plate between the plate and said indicating portion.

4. In combination, electrical measuring means, a casing therefor, an insulating member supported at the rear of said casing, a plurality of contact members supported by said insulating member, an operating member movably supported by said casing, and contact means carried by said operating member for cooperation with said contact members.

5. The combination with a plurality of deflecting systems each comprising a magnetizable vane, of means comprising a permanent magnet for biasing said deflecting systems to predetermined positions, and a plurality of means coacting, respectively, with said magnetizable vanes for actuating said deflecting systems.

6. The combination with a plurality of deflecting systems each comprising a magnetizable vane, of means comprising a single permanent magnet for producing magnetic fields which coact, respectively, with said magnetizable vanes to bias said deflecting systems to predetermined positions, and a plurality of means coacting, respectively, with said magnetizable vanes for actuating said deflecting systems.

In testimony whereof, I have hereunto subscribed my name this 16th day of December, 1921.

FRANK CONRAD.